(12) United States Patent
Loesch et al.

(10) Patent No.: US 10,768,288 B2
(45) Date of Patent: Sep. 8, 2020

(54) AZIMUTH DETERMINATION WITH THE AID OF A RADAR SENSOR

(71) Applicant: Robert Bosch GmbH, Stuttgart (DE)

(72) Inventors: Benedikt Loesch, Stuttgart (DE); Volker Gross, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 227 days.

(21) Appl. No.: 15/485,460

(22) Filed: Apr. 12, 2017

(65) Prior Publication Data
US 2017/0322295 A1     Nov. 9, 2017

(30) Foreign Application Priority Data

May 9, 2016   (DE) .......................... 10 2016 207 871

(51) Int. Cl.
| | | |
|---|---|---|
| *G01S 13/06* | (2006.01) |
| *G01S 13/42* | (2006.01) |
| *G01S 7/03* | (2006.01) |
| *G01S 13/931* | (2020.01) |
| *H01Q 21/06* | (2006.01) |
| *H01Q 1/32* | (2006.01) |

(52) U.S. Cl.
CPC .............. *G01S 13/06* (2013.01); *G01S 7/032* (2013.01); *G01S 13/42* (2013.01); *G01S 13/931* (2013.01); *H01Q 1/3233* (2013.01); *H01Q 21/065* (2013.01)

(58) Field of Classification Search
CPC ................................ G01S 13/06; G01S 7/032
See application file for complete search history.

(56) References Cited

U.S. PATENT DOCUMENTS

| | | | | |
|---|---|---|---|---|
| 6,104,346 A | * | 8/2000 | Rudish ...................... G01S 3/04 342/156 |
| 6,483,459 B1 | * | 11/2002 | Hou .......................... G01S 3/02 342/378 |
| 7,268,722 B2 | * | 9/2007 | Gottwald ............. H01Q 3/2694 342/70 |
| 7,298,314 B2 | * | 11/2007 | Schantz .................... G01S 5/14 342/125 |
| 8,436,763 B2 | | 5/2013 | Wintermantel |
| 2003/0142002 A1 | * | 7/2003 | Winner ................. G01S 13/913 342/36 |
| 2011/0074620 A1 | * | 3/2011 | Wintermantel ......... G01S 7/285 342/70 |
| 2015/0015432 A1 | * | 1/2015 | Chang ..................... G01S 13/38 342/22 |
| 2015/0198712 A1 | * | 7/2015 | Soderi ................... G01S 13/765 342/47 |

\* cited by examiner

*Primary Examiner* — Marcus E Windrich
(74) *Attorney, Agent, or Firm* — Norton Rose Fulbright US LLP; Gerard Messina

(57) ABSTRACT

A radar sensor includes one transmitting antenna, multiple first receiving antennas with the same vertical heights, and a second receiving antenna with a vertical height different from the others. A method for determining the azimuth angle of an object with respect to the radar sensor includes steps of determining an approximation for the azimuth angle in a coarse grid based on the signals of all receiving antennas, and determining the azimuth angle in a fine grid based on the signals of the first receiving antennas in a range around the approximation.

12 Claims, 5 Drawing Sheets

AZIMUTH DETERMINATION WITH THE AID OF A RADAR SENSOR

CROSS REFERENCE

The present application claims the benefit under 35 U.S.C. § 119 of German Patent Application No. DE 102016207871.2 filed on May 9, 2016, which is expressly incorporated herein by reference in its entirety.

BACKGROUND INFORMATION

A relative position of an object with respect to a radar sensor may be determined in that a radar signal is transmitted by the radar sensor and its reflection at the object is received again. The position of the object is generally indicated based on an elevation angle, an azimuth angle, and a distance. For example, a radar sensor may be used on a motor vehicle to detect objects located ahead of the motor vehicle in the driving direction. A coordinate system fixed to the motor vehicle is thereby usually assumed. The azimuth angle is usually determined by the vertical axis with respect to a longitudinal axis of the motor vehicle. Correspondingly, the elevation angle is determined by the transverse axis with respect to the longitudinal axis of the motor vehicle.

The azimuth angle is often determined with the aid of SIMO (single input, multiple output), in particular in close range, when the object is located less than approximately 100 meters away from the motor vehicle. A radar signal is thereby transmitted by a radar antenna and received again by multiple, horizontally offset receiving antennas. Phase differences between the signals of the receiving antennas indicate the azimuth angle. Depending on the necessary horizontal focus of the receiving antennas, these may be placed only relatively far apart from one another, distances usually being used in the wavelength range of the radar signal used. As the number of receiving antennas and the space available for the receiving antennas are usually limited, the azimuth angle may only be determined with limited accuracy and separation capability, and ambiguities (ambiguous solutions) may occur.

U.S. Pat. No. 8,436,763 B2 describes a system of receiving antennas uniformly horizontally offset on a radar sensor for determining an azimuth angle of a reflecting object.

An additional receiving antenna may be provided which has a different vertical height than the remaining receiving antennas. Thus, the elevation angle of the object may be determined. If the additional receiving antenna is used to determine the azimuth angle of the object, then a systematic angular error results in the determined azimuth angle.

An object of the present invention is to provide an improved method for determining the azimuth angle of an object with the aid of a radar sensor. Preferred embodiments of the present invention are described herein.

SUMMARY

An example radar sensor in accordance with the present invention includes a transmitting antenna, multiple first receiving antennas having the same vertical heights and a second receiving antenna having a vertical height different from the others. An example method in accordance with the present invention for determining the azimuth angle of an object in relation to the radar sensor includes steps of determining an approximation for the azimuth angle in a coarse grid based on the signals of all receiving antennas, and determining the azimuth angle in a fine grid based on the signals of the first receiving antennas in a range around the approximation.

The arrangement of the first and second receiving antennas may have an enlarged aperture so that angular accuracy or separation capability is improved. Due to the described two-step method, the azimuth angle of the object may be found with reduced computing power or greater processing speed. An ambiguous solution may already be excluded in the first step, and the correct solution may be refined in the second step.

In another specific embodiment, multiple second receiving antennas may also be used whose vertical height may be equal to one another or different. Thus, a radar sensor as a whole with vertically non-uniformly directed receiving antennas may be used. A conventional radar sensor may be used which is thus improved. The method may also be flexibly adapted to different radar sensors.

It is preferred that the determination of the azimuth angle or the approximation is carried out with the aid of a deterministic maximum likelihood method. In particular, a vector of the signals of the receiving antennas used may thereby be compared with stored vectors of the receiving antennas for a reference signal. This comparison is usually carried out after a scaling of the vectors in order to leave the signal strength out of the comparison. The comparison corresponds to a cross correlation of the scalar product of the complex scaled vectors. The antenna diagram, i.e., the vector of the antenna-specific reference signals, is usually determined for a number of predetermined angles which maintain a predetermined grid among one another.

The finer the grid, the larger the search area, so that an angle determination may require more memory and/or more processing power. Due to the use of two differently sized grids, a simplified search on the coarse grid may be carried out in the first step and the search area in the second step may be narrowed down based on the approximation determined in the first step. As a whole, fewer comparisons may thus be necessary. The determination may be carried out more easily and quickly.

It is further preferred if the coarse grid is three times as large as the fine grid. Thus, a good compromise may be found between saving system resources and accuracy in the first step.

It is particularly preferred if the coarse grid lies in the range of approximately 1°-2° and the fine grid lies in the range of approximately 0.1°-0.5°. The azimuth angles may thus be exactly approximated to approximately 1°-2° in the first step and exactly determined to approximately 0.1°-0.5° in the second step.

A computer program product in accordance with the present invention includes computer program code means for carrying out the method described above when the computer program product runs on a processing unit or is stored on a computer-readable data carrier.

A radar sensor in accordance with the present invention includes a transmitting antenna, multiple first receiving antennas at the same vertical height, a second receiving antenna at a different vertical height, and a processing unit for determining an approximation for the azimuth angle in a coarse grid based on the signals of all receiving antennas and for determining the azimuth angle in a fine grid based on the signals of the first receiving antennas in a range around the approximation.

The processing unit may be configured in particular to carry out the method described above. In addition, the processing unit may include in particular a programmable microcomputer or microcontroller and the method may be present as a computer program product.

The radar sensor may facilitate a fast and accurate determination of the azimuth angle of an object with reduced processing resources.

It is preferred that at least one of the antennas is an antenna array made up of a field of individual patches (patch antenna array). In particular, the field of individual patches may be rod-shaped so that it extends many times longer in the vertical direction than in the horizontal direction. A phase center of the antenna defines its vertical height with respect to a reference coordinate system.

It is further preferred that the difference of the vertical height of the second receiving antenna to the heights of the first receiving antennas is less than the vertical extension of the second receiving antenna. It is particularly preferred that the difference is less than half of the vertical extension of the second receiving antenna. In this way, the arrangement of the receiving antennas may be used in an improved way to determine the azimuth angle and the elevation angle of an object.

BRIEF DESCRIPTION OF THE DRAWINGS

The present invention is described in greater detail with reference to the figures.

DETAILED DESCRIPTION OF EXAMPLE EMBODIMENTS

Figure 1:
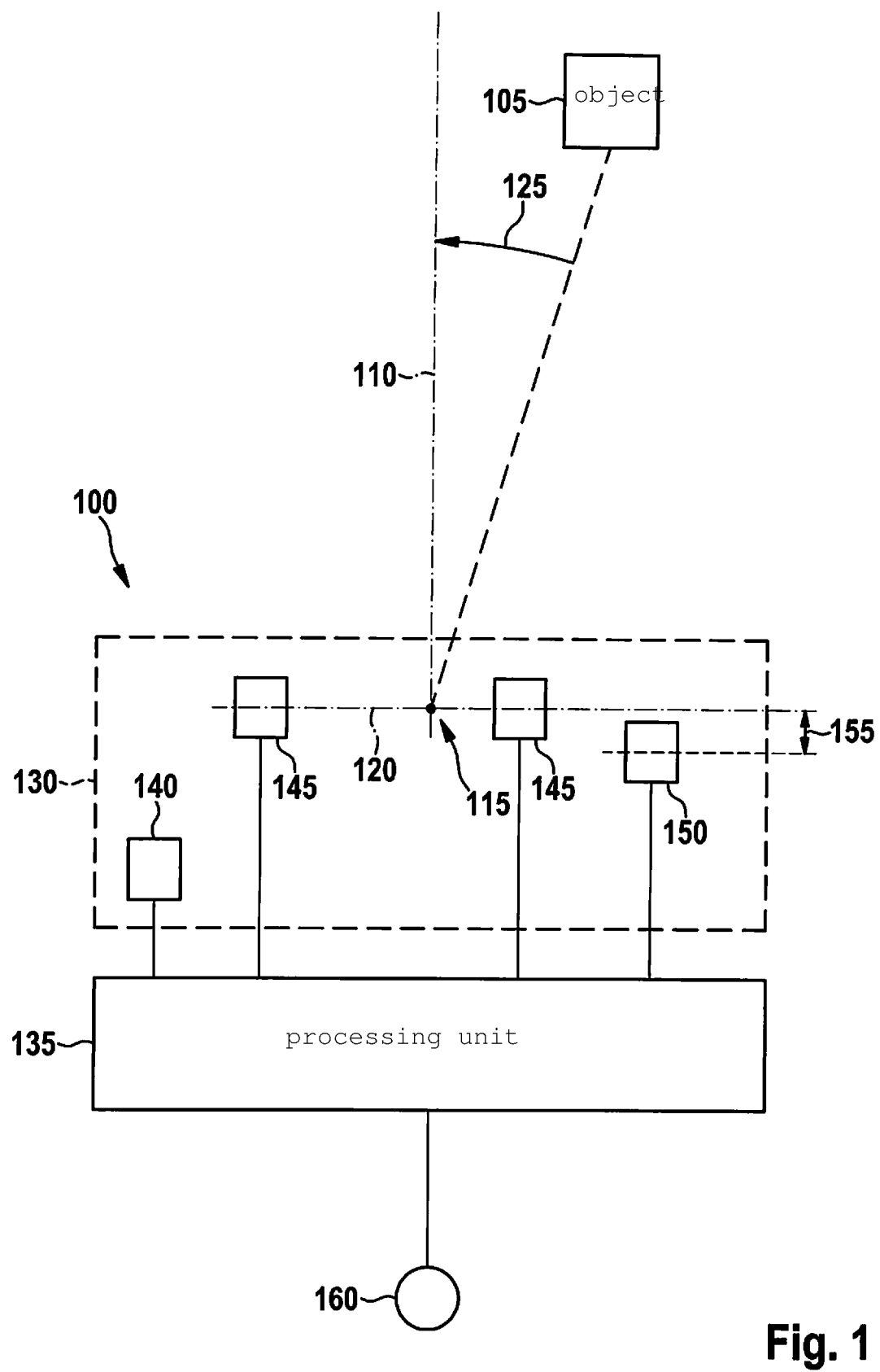
FIG. 1 shows a block diagram of a radar sensor.

FIG. 1 shows an exemplary radar sensor 100 which may be configured for use on a motor vehicle. With the aid of radar sensor 100, the position of an object 105 is to be detected. An elevation angle, an azimuth angle, and a distance of object 105 are thereby usually determined. In another specific embodiment, a size or a movement of object 105 may also be determined. In the following, however, merely the determination of the azimuth angle of object 105 is described in greater detail. A coordinate system is assumed for this purpose which is extended with respect to the motor vehicle. The coordinate system includes a longitudinal axis 110, a vertical axis 115, and a transverse axis 120 which intersect at a shared point and in pairs with one another describe angles of 90°. An azimuth angle 125 of object 105 is indicated by way of example in FIG. 1.

Radar sensor 100 includes, for example, an arrangement 130 and a processing unit 135. Antenna arrangement 130 generally includes a transmitting antenna 140 and multiple receiving antennas. In the specific embodiment shown, two first receiving antennas 145 and one second receiving antenna 150 are provided. The heights of first receiving antennas 145 are the same across transverse axis 120, while the height of second receiving antenna 150 is different. Additional second receiving antennas 150 may also be provided whose vertical distances 155 from transverse axis 120 or from the height of first receiving antennas 145 may be the same or different.

Antennas 140, 145, and 150 are connected to a processing unit 135 which controls the generation and reception of radar signals with the aid of antennas 140, 145, and 150 and determines azimuth angle 125 based on the antenna signals, and preferably provides an interface 160.

To scan object 105, a radar signal is transmitted with the aid of transmitting antenna 140 and received again with the aid of receiving antennas 145, 150. Phase differences between the antenna signals of receiving antennas 145, 150 are utilized with the aid of a search method to determine azimuth angle 125 and, if necessary, the elevation angle of object 105.

Figure 2:
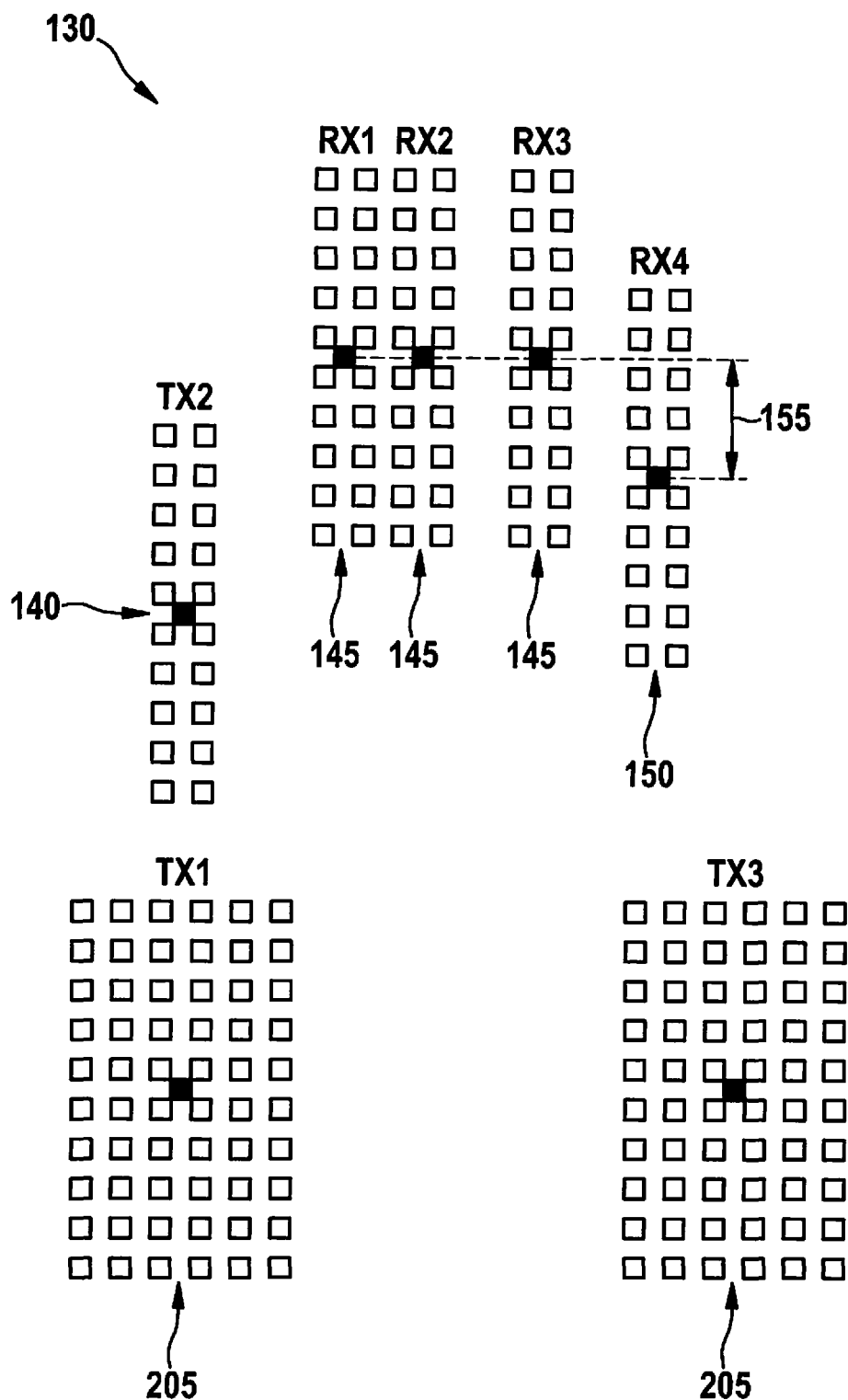
FIG. 2 shows an exemplary antenna arrangement for the radar sensor from FIG. 1.

FIG. 2 shows an exemplary antenna arrangement 130 for radar sensor 100 from FIG. 1. One first and one second far range transmitting antenna 205 are provided in addition to transmitting antenna 140. In addition, three first receiving antennas 145 and one second receiving antenna 150 are provided in the specific embodiment shown. Phase centers for antennas 140, 145, 150, 205 are each denoted by dark marks. The vertical orientation of the depiction of FIG. 2 runs parallel to vertical axis 115 and the horizontal orientation of the depiction runs parallel to transverse axis 120.

All antennas 140, 145, 150, 205 shown are preferably designed as phase-controlled fields, in particular strip-shaped phased array antennas. Thus, an intended directivity for radar signals may be easily implemented. The vertical heights of first receiving antennas 145 are the same, horizontal distances of the three antennas shown being able to be different. Far range transmitting antennas 205 may be used together with transmitting antenna 140 in the far range of object 105 in the MIMO method.

In close range, transmitting antennas 205 are preferably not used and a SIMO method is carried out with the aid of single transmitting antenna 140. A vertical height of transmitting antenna 140 may be offset relative to the heights of first receiving antennas 145 or second receiving antenna 150.

Figure 3:
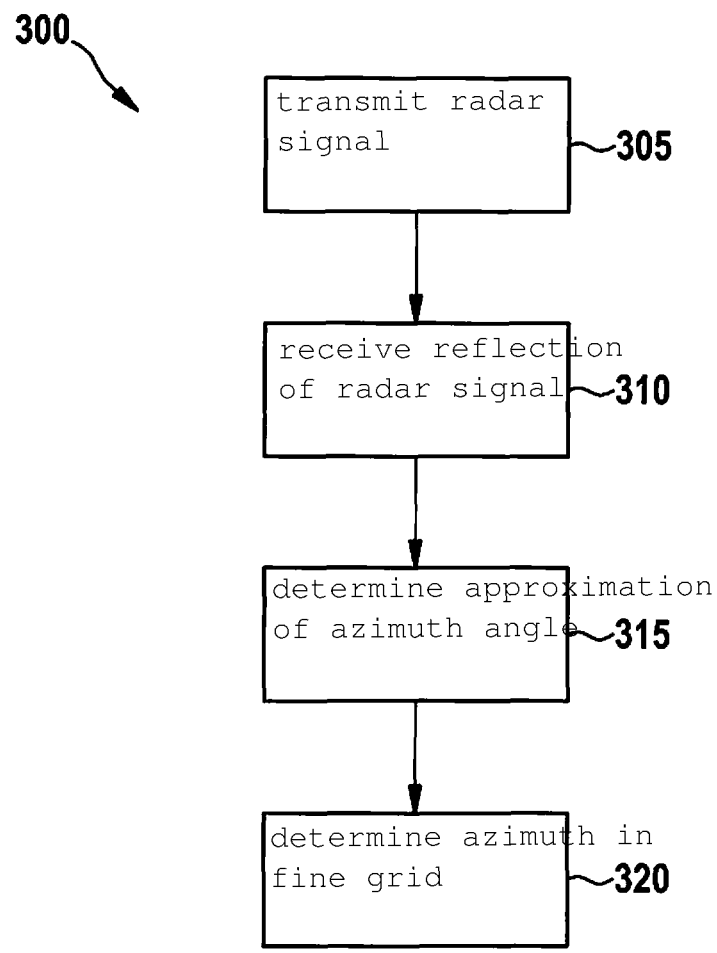
FIG. 3 shows a flow chart of a method for determining an azimuth angle with the aid of the radar sensor from FIG. 1.

FIG. 3 shows a flow chart of a method 300 for determining azimuth angle 125 with the aid of radar sensor 100 from FIG. 1. Method 300 may run in particular on processing unit 135.

In a first step 305, a radar signal is transmitted in the direction of object 105 with the aid of transmitting antenna 140. In a step 310, a reflection of the transmitted radar signals is received with the aid of receiving antennas 145, 150. If a maladjustment of one of receiving antennas 145, 150 is known, this may be applied before an approximation for azimuth angle 125 is determined in a coarse grid based on the antenna signals of all receiving antennas 145, 150. The determination may be carried out in particular with the aid of a maximum likelihood method, in which an antenna pattern is compared with the measuring signal. This corresponds to a cross correlation of the scalar product of the complex scaled vectors. An angle grid is thereby assumed which is relatively rough in step 310 and preferably lies in the range of approximately 1°-2°.

In a step 320, the determination of azimuth angle 125 is carried out in a fine grid in a range around the previously determined approximation of step 315. The fine grid may be, for example, approximately 0.1°-0.5°. Since the search in step 320 only needs to be carried out in a predetermined range of, for example, ±5° around the previously determined approximation, this step may be carried out quickly with little complexity.

Subsequently, determined azimuth angle 125 may be provided, namely, for example, with the aid of interface 160.

Figure 4:
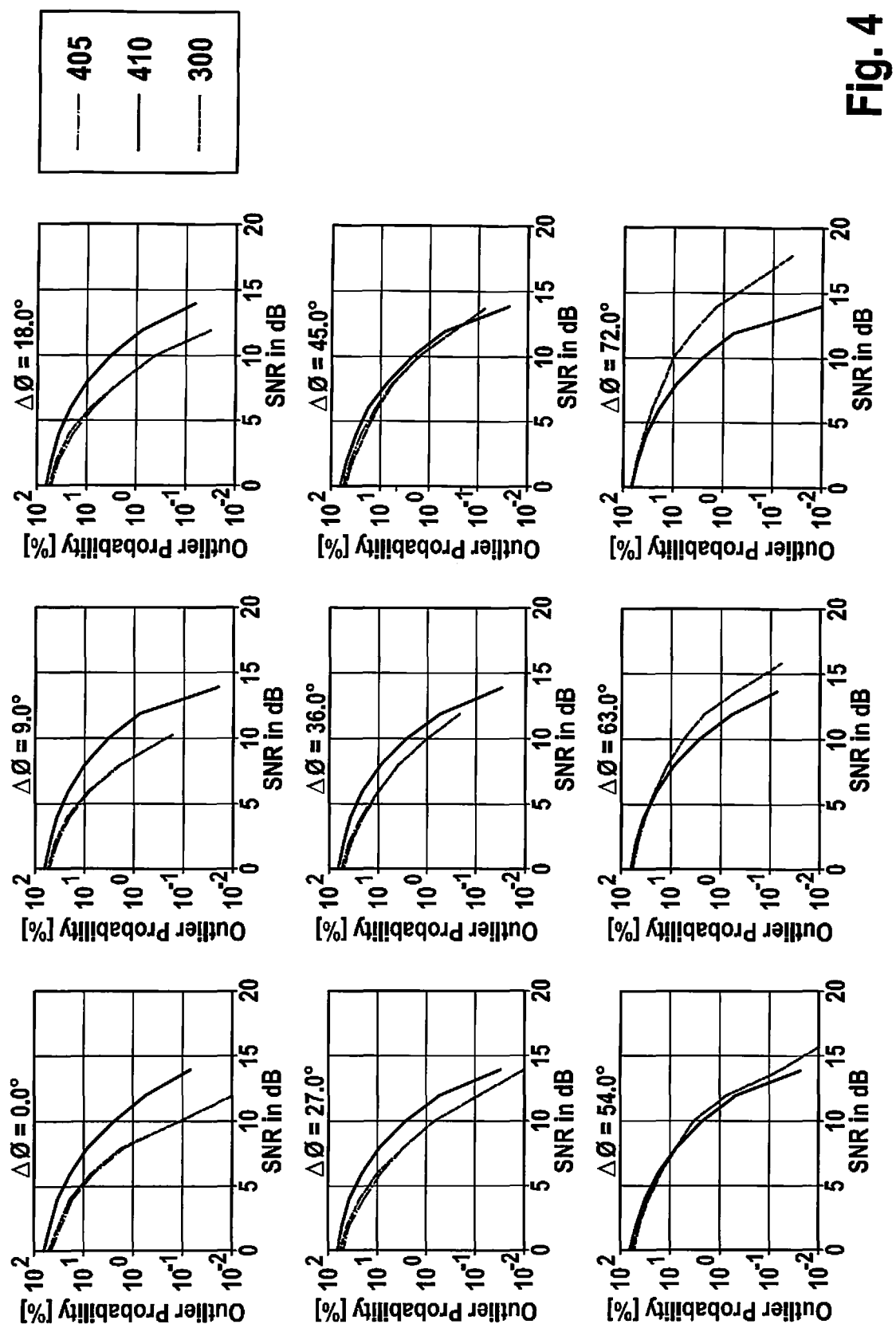
FIG. 4 shows outlier probabilities during the azimuth determination according to different methods.
Figure 5:
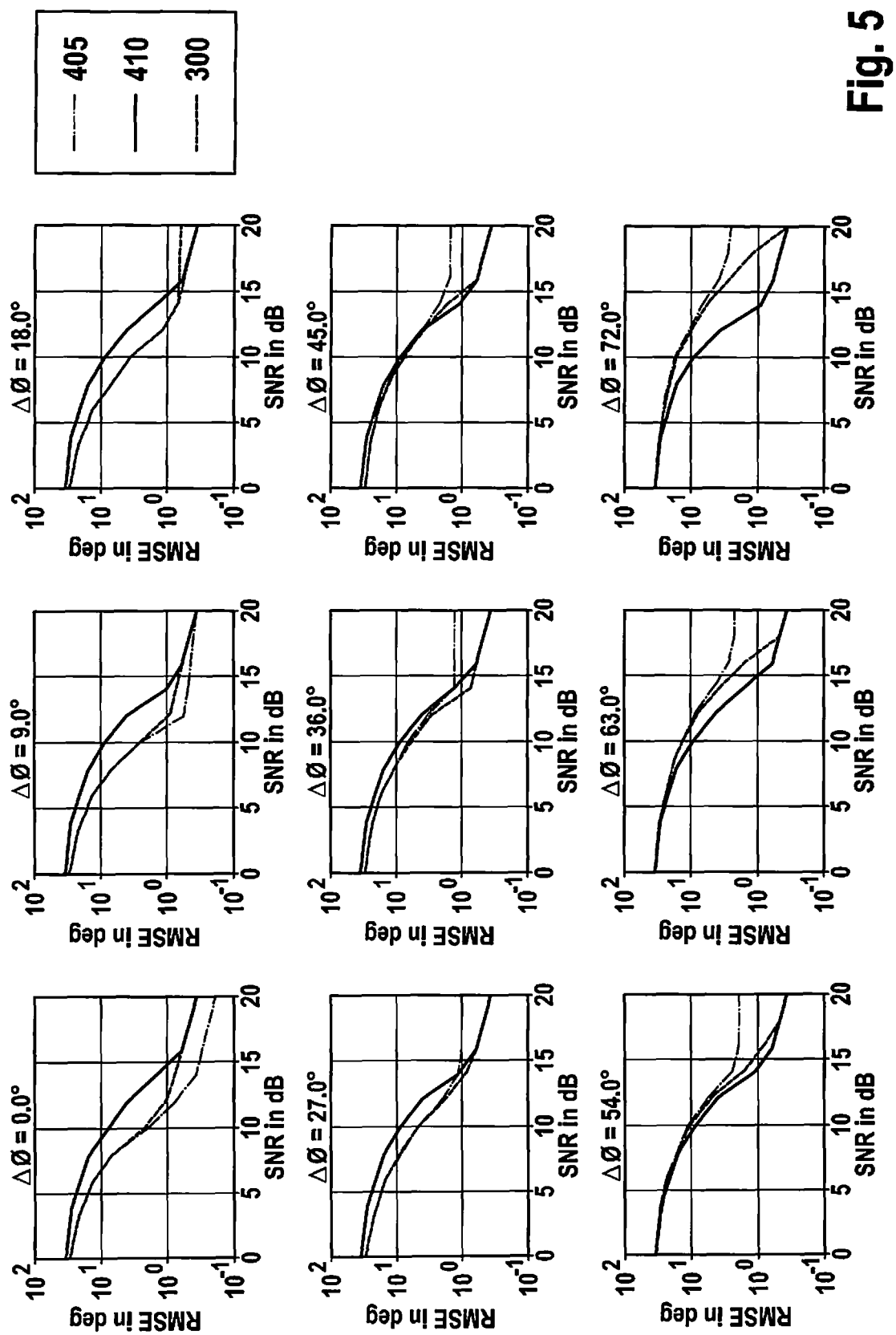
FIG. 5 shows RMSE (root mean square error) during the azimuth determination according to different methods.

FIGS. 4 and 5 show results of a simulation of method 300 from FIG. 3 in comparison to a first comparison method 405, in which azimuth angle 125 is determined in the classical way without the differentiation provided with the aid of receiving antennas 145 and 150, and to a second comparison method 410, in which azimuth angle 125 is determined based solely on the signals of receiving antennas 145. The geometric division of antenna arrangement 130 from FIG. 2 thereby underlies the simulation. Nine diagrams, each shown in FIGS. 4 and 5, are based on different phase differences Δϕ, which are each indicated at the top of each diagram. A phase difference Δϕ of 9° corresponds in this case to an azimuth angle of approximately 1°. The signal-to-noise ratio (SNR) is plotted in the horizontal direction. In FIG. 4, outlier probabilities in percent are entered in the vertical direction, and the roots of the mean square errors (RMSE) are plotted in FIG. 5.

It becomes clear that proposed method 300 delivers better results than the two comparison methods 405 and 410 as long as the phase difference is not more than approximately 45°.

What is claimed is:

1. A method for determining the azimuth angle of an object with respect to a radar sensor, the method comprising:
    transmitting, using a transmitting antenna, a radar signal;
    receiving, using multiple receiving antennas including a plurality of first receiving antennas having a same vertical height and at least one second receiving antenna having a vertical height different from the height of the plurality of first receiving antennas, first reflection signals by the plurality of first receiving antennas and at least one second reflection signal by the at least one second receiving antenna;
    determining an approximation for the azimuth angle in a coarse grid based on both the first reflection signals of the plurality of first receiving antennas and the at least one second reflection signal of the at least one second receiving antenna; and
    subsequently to determining the approximation, determining the azimuth angle in a fine grid based on the first reflection signals of the first receiving antennas in a range around the approximation;
    wherein the determination of one of: i) the azimuth angle, or ii) the approximation, is carried out with the aid of scaling a vector of the signals of the receiving antennas, and comparing the scaled vector of the signals of the receiving antennas with a stored vector for the receiving antennas for a reference signal.

2. The method as recited in claim 1, wherein the determination of one of: i) the azimuth angle, or ii) the approximation, is carried out with the aid of a deterministic maximum likelihood method.

3. The method as recited in claim 2, wherein the coarse grid is at least three times as large as the fine grid.

4. The method as recited in claim 1, wherein the coarse grid lies in the range of 1°-2° and the fine grid lies in the range of 0.1°-0.5°.

5. A non-transitory computer readable storage medium on which is stored program code for determining the azimuth angle of an object with respect to a radar sensor, and the program code, when executed by a computer, causing the computer to control:
    transmitting, using a transmitting antenna, a radar signal;
    receiving, using multiple receiving antennas including a plurality of first receiving antennas having a same vertical height and at least one second receiving antenna having a vertical height different from the height of the plurality of first receiving antennas, first reflection signals by the plurality of first receiving antennas and at least one second reflection signal by the at least one second receiving antenna;
    determining an approximation for the azimuth angle in a coarse grid based on both the first reflection signals of the plurality of first receiving antennas and the at least one second reflection signal of the at least one second receiving antenna; and
    subsequently to determining the approximation, determining the azimuth angle in a fine grid based on the first reflection signals of the first receiving antennas in a range around the approximation;
    wherein the determination of one of: i) the azimuth angle, or ii) the approximation, is carried out with the aid of scaling a vector of the signals of the receiving antennas, and comparing the scaled vector of the signals of the receiving antennas with a stored vector for the receiving antennas for a reference signal.

6. A radar sensor, comprising:
    a transmitting antenna;
    multiple first receiving antennas at the same vertical heights;
    a second receiving antenna at a vertical height different from the height of the multiple first receiving antennas; and
    a processing unit to determine an approximation for the azimuth angle in a coarse grid based on the signals of all of the first receiving antennas and second receiving antenna, and subsequently to determining the approximation, determine the azimuth angle in a fine grid based on signals of the first receiving antennas in a range around the approximation;
    wherein the determination of one of: i) the azimuth angle, or ii) the approximation, is carried out with the aid of scaling a vector of the signals of the receiving antennas, and comparing the scaled vector of the signals of the receiving antennas with a stored vector for the receiving antennas for a reference signal.

7. The radar sensor as recited in claim 6, wherein at least one of the antennas is an antenna array made up of a field of individual patches.

8. The radar sensor as recited in claim 6, wherein a difference between the vertical height of the second receiving antenna and the heights of the first receiving antennas is less than a vertical extension of the second receiving antenna.

9. The method as recited in claim 1, wherein the multiple receiving antennas are strip-shaped phased array antennas.

10. A method for determining the azimuth angle of an object with respect to a radar sensor, the method comprising:
    transmitting, using a transmitting antenna, a radar signal;
    receiving, using multiple receiving antennas including a plurality of first receiving antennas having a same vertical height and at least one second receiving antenna having a vertical height different from the height of the plurality of first receiving antennas, first reflection signals by the plurality of first receiving antennas and at least one second reflection signal by the at least one second receiving antenna;
    determining an approximation for the azimuth angle in a coarse grid based on both the first reflection signals of the plurality of first receiving antennas and the at least one second reflection signal of the at least one second receiving antenna; and
    subsequently to determining the approximation, determining the azimuth angle in a fine grid based on the first reflection signals of the first receiving antennas in a range around the approximation;

wherein the determination of one of: i) the azimuth angle, or ii) the approximation, is carried out with the aid of comparing a vector based on the signals of the receiving antennas with a stored vector for the receiving antennas for a reference signal, and wherein stored vectors for the receiving antennas correspond to a plurality of predetermined angles.

11. The method as recited in claim 1, wherein the at least one second receiving antenna includes a plurality of second receiving antennas with vertical heights different from each other.

12. A method for determining the azimuth angle of an object with respect to a radar sensor, the method comprising:
transmitting, using a transmitting antenna, a radar signal;
receiving, using multiple receiving antennas including a plurality of first receiving antennas having a same vertical height and at least one second receiving antenna having a vertical height different from the height of the plurality of first receiving antennas, first reflection signals by the plurality of first receiving antennas and at least one second reflection signal by the at least one second receiving antenna;

determining an approximation for the azimuth angle in a coarse grid based on both the first reflection signals of the plurality of first receiving antennas and the at least one second reflection signal of the at least one second receiving antenna; and subsequently to determining the approximation, determining the azimuth angle in a fine grid based on the first reflection signals of the first receiving antennas in a range around the approximation;

wherein the determination of one of: i) the azimuth angle, or ii) the approximation, is carried out with the aid of comparing a vector based on the signals of the receiving antennas with a stored vector for the receiving antennas for a reference signal, and wherein the plurality of first receiving antennas includes at least three antennas having unequal horizontal spacing between each other.

* * * * *